July 21, 1925.

C. C. MERRITT

LOCOMOTIVE CROSSHEAD

Filed June 6, 1924

1,546,396

Inventor
Charles C. Merritt,
By Bernard B. Garney
Attorney

Patented July 21, 1925.

1,546,396

UNITED STATES PATENT OFFICE.

CHARLES C. MERRITT, OF JOHNSTOWN, PENNSYLVANIA, ASSIGNOR OF THREE-TENTHS TO JOSEPH SICILIANO, OF JOHNSTOWN, PENNSYLVANIA.

LOCOMOTIVE CROSSHEAD.

Application filed June 6, 1924. Serial No. 718,324.

*To all whom it may concern:*

Be it known that I, CHARLES C. MERRITT, a citizen of the United States, residing at Johnstown, in the county of Cambria and State of Pennsylvania, have invented certain new and useful Improvements in Locomotive Crossheads, of which the following is a specification.

The present invention consists of a locomotive cross head with provision for taking up wear without dismantling or otherwise interfering with other parts of the locomotive.

The principal object of the invention is to provide a cross head having separable parts to permit expeditious replacement or repair of any part which wears down or is incapacitated.

A further object of the invention is to provide a cross head which although composed of separable parts nevertheless provides a durable structure since the parts are so assembled as to provide a substantially unitary structure which withstands strain as an entirety and does not subject any one part to the wear and tear resultant from the reciprocating action of the piston.

Other objects of the invention will be apparent from the following description of the preferred form of the invention taken in connection with the accompanying drawings, wherein:—

Figure 1:
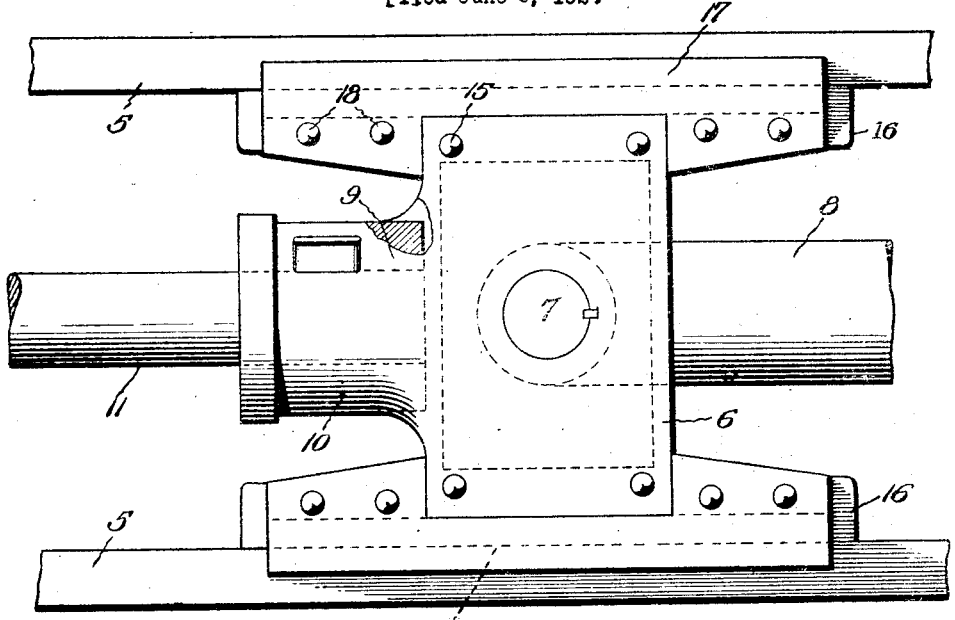
Fig. 1 is a side elevational view of a cross head constructed in accordance with the present invention illustrating its application.

In the drawings, in order to illustrate the application of the present invention a pair of cross head guides 5 are shown which may be of conventional design.

Figure 3:
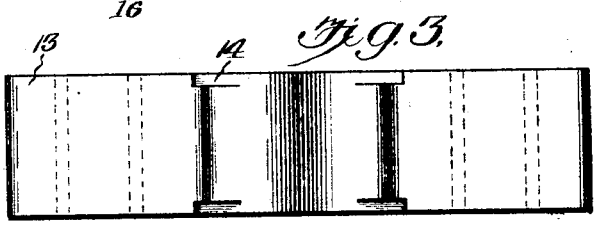
Fig. 3 is a bottom plan view of one of the shoes forming part of this invention.
Figure 2:
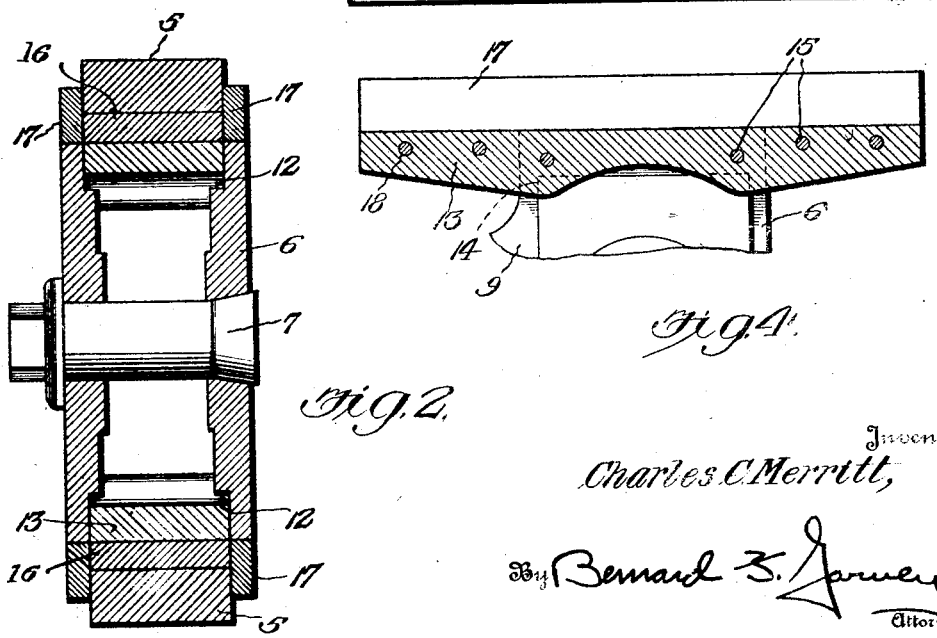
Fig. 2 is a vertical sectional view of the same.
Figure 4:
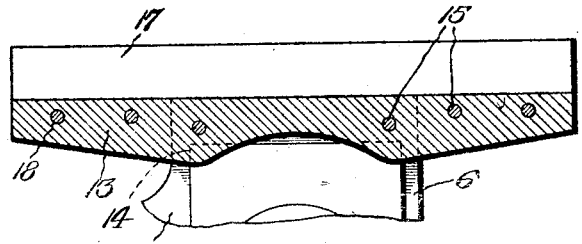
Fig. 4 is a detail fragmentary longitudinal sectional view taken through one of the shoes illustrating the application of one of the side liners.

The cross head constructed in accordance with the present invention consists of wrist pin plates 6 which are provided with central openings adapted for the reception of a wrist pin 7, the wrist pin being adapted for engagement with one end of the main shaft 8 in a manner well known in the art. At one end the side plates 6 are equipped with marginal extensions 9 to which a piston rod socket 10 is integrally connected. The piston rod socket is adapted to receive one end of a piston rod 11 in the usual manner. Upon reference to Fig. 2 of the drawings it will be noted that portions of the inner faces of the plates 6 are removed to provide shoulders 12 upon which shoes 13, constructed in accordance with the present invention, are mounted. The shoes 13 have the inner faces thereof cut out as indicated at 14 and shown to advantage in Fig. 3 to complement the shoulders 12. Consequently, the shoes 13 snugly embrace said shoulders and pressure exerted upon said shoes will be transmitted to the wrist pin plates 6 in an apparent manner. The outer faces of the shoes are adapted to lie flush with the outer terminals of the plates 6. The shoes 13 are detachably engaged to the plates 6 by means of bolts 15.

Each of the shoes 13 has a gib 16 detachably mounted thereon, each gib having the terminals thereof bent downwardly at right angles for engagement with the terminals of the shoe. The gib may be slidably removed from either side of the shoe.

Both sides of each shoe 13 are engaged with side liners 17 each side liner having a portion midway its ends cut out for the reception of one of the terminals of the wrist pin plates 6. The side liners are detachably engaged with the shoes 13 by means of bolts 18. Each side liner has a portion thereof projected appreciably beyond the outer face of the gib 16 so as to embrace the locomotive cross head guides 5.

From the above it is apparent that the gibs of the cross head are slidably engaged with the cross head guides 5 and the cross head held from displacement by the side liners 17. Since the side liners 17 are detachable it is apparent that any wear on any of the side liners 17 may be quickly taken up by removing the side liner and building it up or otherwise repairing it. Moreover, either of the gibs 16 may be expeditiously removed by removing the side liners, and if it should be desired to remove either of the shoes 13 it is only necessary to remove the two side liners 17 which embrace the shoe. Consequently, any part may be removed and repaired or replaced in a minimum period of time. Moreover, since the shoes are mounted directly on the wrist pin plates 6, all strain exerted upon any of the parts is distributed to said plates so as to prevent premature incapacitation of any one of the parts. This assemblage of cross head parts is relatively simple and inexpensive to manufacture and in view of the manner of connecting the parts a very durable structure is provided. The equal distribution of wear on the parts not only augments the durability of the cross head but minimizes the possibility of the cross head being disaligned.

Various changes may be made in this device especially in the details of construction, proportion and arrangements of parts within the scope of the claims hereto appended.

What is claimed is:

1. A locomotive cross head including wrist pin plates having shoulders formed on their inner faces, shoes detachably mounted between said plates and resting on said shoulders, an integral gib mounted on each shoe, and side liners mounted on said wrist pin plates and detachably engaged with said shoes.

2. A locomotive cross head including wrist pin plates for engagement with a piston rod and shaft, shoulders formed on the inner faces of said plates, shoes each of which is provided with cut out portions complementing said shoulders, an integral gib slidably mounted on each shoe for slidable engagement with a cross head guide, and side liners mounted on said shoes to embrace the sides of the locomotive cross head guides.

3. A locomotive cross head including a pair of wrist pin plates equipped with locomotive guide embracing shoes, and side liners detachably engaged with said shoes and provided with cut out portions to receive said plates, said side liners embracing the opposite sides of the cross head guides.

CHARLES C. MERRITT.